United States Patent Office 2,900,353
Patented Aug. 18, 1959

2,900,353

COMBINED ELECTRON AND ION EXCHANGE COMPOSITIONS

Harold G. Cassidy, West Haven, Conn., and Myer Ezrin, Springfield, Mass., assignors to Research Corporation, New York, N.Y., a corporation of New York No Drawing. Application November 15, 1954
Serial No. 469,005

8 Claims. (Cl. 260—2.2)

This invention relates to novel polymeric products characterized by both electron and ion exchange properties.

Electron exchange polymers have been described by Cassidy et al. in the Journal of the American Chemical Society, vol. 71, 402–410 (1949) and vol. 75, 1610–1617 (1953) and in copending applications Serial No. 136,428, filed Dec. 31, 1949, and Serial No. 388,657, filed Oct. 27, 1953.

Among the objects of this invention are the provision of novel polymers characterized by both electron and ion exchange properties, of hydrophilic polymers of the above character, and of polymers of this type which are insoluble in water but capable of being swollen thereby.

The above objects have been accomplished, in accordance with this invention, by the preparation of sulfonated copolymers of vinylhydroquinone with vinyl monomers having the formula

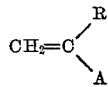

where R is selected from the group consisting of hydrogen and alkyl containing 1 to 8 carbon atoms and A is a monovalent aryl radical such as phenyl, diphenyl, naphthyl, substituted phenyl, for example chlorophenyl, alkoxyphenyl and carboxyphenyl, and similarly substituted naphthyl. The above copolymers may also include units derived from additional monomers having ethylenic unsaturation such as vinylpyridine, vinyl chloride, vinyl acetate, acrylic and alkylacrylic acids and esters thereof characterized by the formula

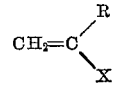

where R is chosen from the group consisting of hydrogen and alkyl containing 1 to 8 carbon atoms and X is a polar monovalent radical.

It has been found that the above-described sulfonated copolymers possess enhanced hydrophilic properties as compared with the unsulfonated copolymers which generally are water-insoluble and hydrophobic.

By controlling the extent of sulfonation, it has been found possible to produce copolymerized products which vary from hydrophilic solids which are unswollen and insoluble in water to water-soluble solids, as well as intermediate stages where the polymer is swollen by water but insoluble therein.

Solubility in water is generally attained when the extent of sulfonation is such that the polymer contains about one sulfonic group (—SO$_3$H) per aryl group A in the above formula in a copolymer consisting of a mole of

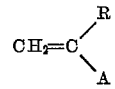

unit per mole of vinylhydroquinone. However, even at this ratio, water solubility can be decreased by increasing the proportion of vinyl hydroquinone or other ethylenic monomer which is not readily sulfonated in the copolymerized composition. Likewise, the water solubility of the sulfonated copolymer can be decreased by cross-linking the copolymer by means of a difunctional cross-linking monomer such as divinyl benzene which may be used in the generally available commercial form, comprising a mixture of the three isomers together with some ethyl vinyl benzene and diethyl benzene. Other divinyl monomers useful in this regard are of the symmetrical type such as divinyl biphenyl, divinyl ether, diallyl phthalate, or ethylene glycol dimethacrylate or of the unsymmetrical type such as vinyl acrylate, allylmethacrylate or vinyl chlorovinyl ether. A suitable diisocyanate may be used.

The lower limit of sulfonation to result in appreciable beneficial effects corresponds to the introduction of substantially one sulfonic group per twenty monomeric units in the polymer. Thus, the polymer will generally be rendered hydrophilic but still water insoluble by sulfonating to a ratio of substantially one sulfonic per ten aryl groups when the copolymer contains one mole of

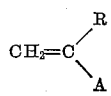

monomer for each mole of vinylhydroquinone, to a ratio of one sulfonic to each aryl group when the copolymer contains about 19 moles of vinylhydroquinone per mole of

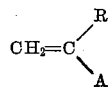

monomer, and to a ratio of one sulfonic per 19 aryl groups when the copolymer contains about 19 moles of

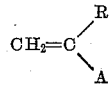

monomer per mole of vinyl hydroquinone.

The sulfonation may be controlled so that up to two sulfonic groups are introduced per A group in order to obtain a polymer with increased water solubility, when desired, in copolymers containing less than equimolal of

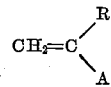

and vinyl hydroquinone. Intermediate degrees of sulfonation will at times be expedient.

When the sulfonic groups are introduced into a previously copolymerized product, the extent of sulfonation can readily be controlled by regulating the time or temperature or both, if concentrated sulfuric acid is used as the sulfonating agent. The concentration of sulfonating agent provides an additional means of control if a more active agent such as fuming sulfuric acid or chlorosulfuric acid is employed.

The sulfonated copolymers of this invention may also be prepared by employing a sulfonated monomer

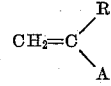

for example sulfonated styrene, in producing the copolymer containing vinylhydroquinone units.

The proportions of the different types of monomeric units in accordance with this invention may be varied between wide limits, thus enabling the preparation of polymeric products having properties best suited for the desired purpose. Thus, a copolymer containing 95 moles of vinyl hydroquinone per 5 moles of

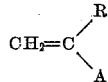

having a ratio of one sulfonic group for each A group, is particularly adapted for reversible oxidation-reduction reactions. However, a copolymer containing 5 moles of hydroquinone units to 95 moles of

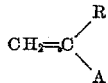

having a ratio of one to three sulfonic group for each nineteen A groups, is especially adapted for base exchange purposes, while retaining reversible oxidation-reduction ability.

Further moderation or modification of the copolymer properties can be secured by incorporating in the copolymer up to about a half or three-quarters of the final composition of one or more

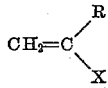

monomer units, as defined above. Also, as stated above, further modification in solubility and physical properties results when a difunctional cross-linking agent is added to the polymerization mixture.

Hydrophilic copolymers which are insoluble in water but swollen thereby are particularly advantageous for use in electron and base exchange treatments carried out in aqueous solution, because of the increased convenience in handling and improved speed of treatment, as well as greater availability of the functional groups.

The copolymers may be prepared having a controlled high molecular weight, through addition polymerization, as most convenient for the desired purpose, by the known methods of bulk, solution, suspension, or emulsion polymerization, for example, as disclosed in the copending application Serial No. 388,657, filed October 27, 1953.

The invention is illustrated by the following detailed embodiments, but it will be understood that these are not to be considered as limiting the novel features in view of the modifications thereof which will be obvious to those skilled in the art, particularly in view of the above description.

*Example 1*

A copolymer of vinylhydroquinone dibenzoate (2,5-dibenzoxy styrene) with alpha-methyl-styrene, in the molecular ratio of 1:1, prepared as described in co-pending application Serial No. 388,657, filed October 27, 1953, or in the Journal of the American Chemical Society, vol. 75, p. 1612 (1953), was sulfonated for the purpose of increasing its water solubility. The copolymer, 42.7 mg., was treated with 1.8 ml. concentrated sulfuric acid at 0–5° C. for 35 minutes in water. A clear solution was produced. At the end of the sulfonation, conveniently determined by testing the solubility of a drop of the mixture, the mixture was dissolved to 100 ml. water, and 0.8 ml. concentrated sulfuric acid was added to bring the pH to 0.53. This material was titrated with 0.0483 N ceric sulfate, pH 0.54. Very little pink coloration was observed during the titration. At the endpoint the solution was a light, bright yellow. There was no precipitation of polymer. The oxidant consumed amounted to 0.205 meq. (milliequivalent). The observed midpoint potential using a saturated calomel electrode against platinum at 30° C. was 0.710 v. On the basis of a saponification equivalent determined on another sample of the same copolymer the oxidation accounted for 99.5% of the available oxidizable groups, assuming complete removal of the benzoyl groups (used for temporary protection of the redox groups during polymerization) during sulfonation. The oxidized polymer solution was then treated with the equivalent amount of 0.05 N stannous chloride for 9 hours, giving a colorless (i.e., reduced) solution containing no stannous ion. Excess stannous chloride was added and the mixture back-titrated with ceric sulfate. Again the yellow color of oxidized polymer was obtained, and virtually all the calculated redox groups were found to be available.

It was found that when polyvinylhydroquinone dibenzoate (i.e., not the copolymer) was treated in the above manner with concentrated sulfuric acid very little sulfonation occurred, indicating that the

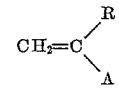

portion of the copolymer chain is the part subject to sulfonation.

*Example 2*

The copolymer of vinyl hydroquinone dibenzoate with alpha-methyl-styrene, referred to in Example 1, was treated as follows. Forty-three and six-tenths mg. was treated for 30 minutes with 1.0 ml. concentrated sulfuric acid at 0–5° C., added to 35 ml. water, then 55 ml. 0.12 N sodium hydroxide solution were added and the volume brought to 100 ml. with water. The pH of the solution so prepared was 11.7. When the solution became alkaline it became blue, then violet, then red. Nitrogen was passed in and 0.6 ml. of substantially 0.2 N sodium hydrosulfite solution was added. The solution became colorless. The solution was titrated with bromine in a solvent of the same composition, namely substantially 0.17 M sodium sulfate and 0.06 N sodium hydroxide, pH 11.45, using a saturated calomel electrode against shiny platinum. During the titration the initially colorless solution became faintly then more intensely pinkish-violet, then at the mid-point, green, later yellowish green, and finally at the end-point light, clear yellow. Allowing for the preliminary titration of the slight excess of hydrosulfite (judging also by the color changes of the solution) a mid-point could be calculated with an observed potential close to 0.200 volt.

*Example 3*

A cross-linked copolymer of vinylhydroquinone dibenzoate and alpha-methyl styrene monomers in the molecular ratio of 1:1, was prepared, taking 12.5% by weight of these monomers of the commercial divinylbenzene mixture for cross linking (this gives 5–6% by weight of divinylbenzene isomers) and catalyzing the reaction with 1.5% by weight of benzoyl peroxide. The emulsifying agent used was soluble starch. Recipe: 5.000 g. vinyl hydroquinone dibenzoate; 1.737 g. α-methyl styrene; 0.712 g. divinyl benzene; 0.111 g. benzoyl peroxide; 62 ml. water; 1.58 g. soluble starch. The organic mixture, warmed slightly, is added to the stirred, hot, starch solution, temperature of outside bath 105°. In 2¾ hrs. hard beads were present. Stirred 10¼ hrs., let stand, hot, for curing, overnight, ca. 12 hrs. Washed many times with water; extracted with boiling toluene. Some of this resin, 0.2058 g., was swollen by several treatments with hot benzene in a sintered glass funnel arranged in a suction flask so that the liquid could easily be removed by suction. The excess benzene was removed, taking care to leave the resin in the swollen condition. The resin was then treated on the funnel with concentrated sulfuric acid (2–3 ml.) at about 20° C. for 2⅔ hours, causing the color of the resin to change from colorless to reddish brown. After removal of the excess acid, the resin was treated in turn with 90%, 80%, 40%, 20%, 10%, 5% sulfuric acid, and washed with water several times. The resin when wet had a light pink color. It was washed with 95% alcohol, and again with water, after which it was dried in a desiccator, giving 0.199 g. of brown, hygroscopic particles. The product was highly swollen in water, and appeared nearly colorless when in this condition.

Example 4

The cross-linked and sulfonated polymer described in Example 3 was saponified to insure complete removal of any benzoyl groups that might have survived the sulfonation procedure. The material was in the form of small, irregular-shaped particles. A small pad of glass wool was placed just above the stopcock of a 10 ml. burette, measuring 33.0 mm./1.00 ml., and 99.5 mg. of this resin was introduced in the dry form. It gave a bed height of close to 10.5 mm. (0.318 ml.). After being swollen with water the height of the bed was close to 34.5 mm. (1.045 ml.). The initial column of dry resin was brown in color; the swelled resin was light tan. The resin was treated in sequence with acid potassium iodide solution for reduction of the resin (oxidation of the iodide to iodine by the polymer) and slightly basic potassium iodide (in a pH 7.9 phosphate buffer) containing iodine for the oxidation of the resin (reduction of iodine to iodide by the polymer). After treatment with a given reagent the bed was washed and brought to the proper pH for the next treatment by use of the appropriate solvent, as follows:

(1) Ten ml. of 2.5% KI in 0.1 N HCl was passed into the resin slowly. The height of the bed changed to 25 mm. No iodine was produced, indicating that the polymer was in the reduced form. On washing with water the bed height became 33 mm. The swelling and shrinking observed in these beds is produced by salt effects as well as redox effects.

(2) The bed was washed with buffer at pH 7.9. It shrank to 25 mm. On treatment with 0.05 N iodine in KI solution and buffer, 0.551 meq. iodine was reduced. During the process some iodine was sorbed by the bed, but it could be washed out with alcohol. The resin became dark reddish-brown.

(3) The reduction step was repeated, except that for the removal of traces of sorbed iodine a solution of 2.5% KI in 90% acetic acid, 0.1 N in HCl, was used. The bed oxidized 0.392 meq. iodide to iodine. At the end, after washing with 0.2 N HCl solution the bed was 30 mm. in height and light tan in color.

(4) The red-brown column was allowed to stand for about seven months in acid medium, during which time some air oxidation may have occurred. An oxidation step was then carried out as above using as oxidant one part of 0.1051 N iodine in KI solution mixed with two parts phosphate buffer of pH 8. Iodine, 0.558 meq., was reduced by the polymer.

(5) A reduction step accounted for 0.276 meq. iodide converted to iodine.

This indicates that the column was fairly stable, in that after seven months' standing in acid its previous behavior was reproduced.

(6) That the sulfonated, cross-linked polymer is also an ion exchange polymer was shown as follows. The column was treated with 6 N sulfuric acid solution. This converted the sulfonic acid groups to the acid form. The column was then washed with water until the effluent was neutral. Then on addition of 2 M KCl solution the effluent promptly became strongly acid. This behavior is represented by the following equation:

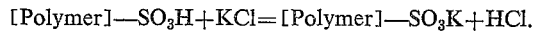

[Polymer]—SO$_3$H+KCl = [Polymer]—SO$_3$K+HCl.

Example 5

A cross-linked copolymer was prepared as follows. Vinylhydroquinone dibenzoate, 2.00 g., was mixed with 0.6875 g. alpha-methyl styrene, 0.6145 g. vinyl pyridine, 0.356 g. divinyl benzene mixture (containing 50–60% divinyl benzene isomers) and 0.0545 g. benzoyl peroxide. This contains the principal monomers in the molecular ratio 1:1.0:1.0, with about 6% divinyl benzene and 1.5% catalyst. The vinyl pyridine, water-white, had been freshly distilled under nitrogen. The mixture was put into a hot, vigorously stirred solution of 39.5 ml. water and 1.2 g. of soluble starch. Some foam was produced. The mixture was stirred at a bath temperature of about 85° C. for about 5 hours. Hard beads were present. The stirring was stopped and the beads were allowed to remain at this temperature for about sixteen hours. The resulting glistening yellow beads were washed thoroughly first with cold water, to remove starch, and allowed to air dry. The beads were then refluxed several times with benzene to remove any unreacted monomers. During this process there was some swelling. The beads were allowed to air dry.

A sample of the beads, dried in vacuo over P$_2$O$_5$ to constant weight, analyzed for 78.8% C.; 5.6% H; 1.16% N.

A sample of the polymer was saponified with sodium ethylate in the usual manner, in the strict absence of oxygen. The saponification mixture was made acid with dilute sulfuric acid, and the saponified particles filtered off as reddish-brown particles. The smaller beads were spherical. Most of the larger beads had shattered to give irregular-shaped particles. The saponified copolymer does not swell as readily in benzene as does the unsaponified copolymer.

Example 6

The cross-linked copolymer containing pyridine groups, described in the previous example, was now available in the yellow bead form as prepared and purified, and in the reddish brown saponified form. Both forms were sulfonated by the following general procedure. The polymer sample was swelled by placing it in benzene. The excess benzene was then removed, and the polymer was cooled in a bath at 0° C. and treated for about two hours with about twice its volume of cold concentrated sulfuric acid. A longer time of treatment, or a more elevated temperature will increase the degree of sulfonation, and vice versa. A greater or a lesser degree of sulfonation may be desired depending on the intended use of the product.

After suitable contact with the concentrated sulfuric acid (chlorosulfonic acid and similar sulfonating agents may likewise be utilized), the excess acid is removed and replaced with successively more dilute aqueous solutions of sulfuric acid, for example with 90%, then 80%, 70%, 60%, 50%, 30%, and 10% sulfuric solutions, and then with water. Sufficient time for thorough contact is permitted between changes in concentration. This tends to prevent shattering of the beads which usually occurs when pure water is used at once after sulfonation.

During the described sulfonation the yellow unsaponified polymer turned red-orange on contact with the sulfuric acid; the saponified material turned very dark. A little yellow material slowly diffused out of both samples into sulfuric acid. This may have been low molecular weight material.

At the end of the sulfonations the two samples were washed thoroughly with cold water, during which the unsaponified beads became bright pink and then yellow. The dark, sulfonated saponified material became lighter in color and finally a translucent red.

Two small chromatography tubes were prepared, each containing a small wad of glass wool. Each sample was placed in a tube to form a small bed, about as wide as it was deep. Passage of water through these beds yielded a neutral effluent. When (neutral) 2 molar potassium chloride solution was passed through the beds both effluents were acidic, that from the sulfonated saponified polymer being strongly acidic. This gave clear evidence that sulfonation had occurred.

We claim:

1. The product obtained by the sulfonation of a copolymer of vinylhydroquinone with a monomer of the formula

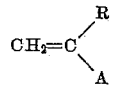

wherein R is selected from the group consisting of hydrogen and alkyl groups containing 1 to 8 carbon atoms and A is a monovalent aryl radical.

2. A sulfonated copolymer as defined in claim 1 including an additional different monomer having ethylenic unsaturation copolymerized therewith.

3. A sulfonated copolymer as defined in claim 2 wherein the additional monomer is vinylpyridine.

4. A sulfonated copolymer in accordance with claim 1 containing at least one sulfonic group for each twenty monomeric units in the copolymer.

5. A sulfonated copolymer as defined in claim 1 wherein the copolymer additionally includes a cross-linking difunctional monomer copolymerized therewith.

6. A sulfonated copolymer as defined in claim 1 wherein at least a portion of the said monomer is divinylbenzene.

7. A sulfonated copolymer as defined in claim 1 wherein at least a portion of the said monomer is alpha-methylstyrene.

8. A sulfonated copolymer as defined in claim 1 wherein at least a portion of the said monomer is styrene.

References Cited in the file of this patent

UNITED STATES PATENTS

| | | |
|---|---|---|
| 2,366,507 | D'Alelio | Dec. 26, 1944 |
| 2,527,300 | Dudley | Oct. 24, 1950 |
| 2,735,837 | Minsk | Feb. 21, 1956 |

OTHER REFERENCES

Ezrin et al.: Journal Amer. Chem. Soc., vol. 75, page 1610–1614, 1953. (Copy in Scientific Library.)